United States Patent [19]

Demmer

[11] Patent Number: 4,642,689
[45] Date of Patent: Feb. 10, 1987

[54] INCREASING THE RESOLUTION OF A DIGITIZED, TIME-DEPENDENT SIGNAL

[75] Inventor: Walter H. Demmer, Hamburg, Fed. Rep. of Germany

[73] Assignee: U. S. Philips Corporation, New York, N.Y.

[21] Appl. No.: 684,201

[22] Filed: Dec. 20, 1984

[30] Foreign Application Priority Data

Dec. 23, 1983 [DE] Fed. Rep. of Germany ....... 3346570

[51] Int. Cl.⁴ .............................................. H04N 5/14
[52] U.S. Cl. ..................................... 358/166; 358/138
[58] Field of Search .................. 358/166, 138, 160, 37

[56] References Cited

U.S. PATENT DOCUMENTS

| 4,168,509 | 9/1979 | Hartmann | 358/138 |
| 4,334,244 | 6/1982 | Chan et al. | 358/166 |
| 4,408,233 | 10/1983 | Nahon et al. | 358/166 X |
| 4,450,483 | 5/1984 | Coriello | 358/166 |
| 4,573,070 | 2/1986 | Cooper | 358/166 X |

Primary Examiner—Howard W. Britton
Assistant Examiner—Victor R. Kostak
Attorney, Agent, or Firm—Thomas A. Briody; William J. Streeter; Leroy Eason

[57] ABSTRACT

In a method of increasing the resolution of a digitized time-dependent signal, particularly a picture signal, which consists of a sequence of sampling values, teaches the forming at one sampling value an associated mean value with higher resolution. The associated mean value is formed from the sampling value and at least one succeeding and/or preceding sampling value. When the sampling value is replaced by the associated mean value, obliteration of rapid signal changes is eliminated; and circuit complexity is minimized by the fact that a sampling value is replaced by the associated mean value only when these two values differ from one another by no more than a preset amount. A circuit for implementing this method is also disclosed.

15 Claims, 4 Drawing Figures

INCREASING THE RESOLUTION OF A DIGITIZED, TIME-DEPENDENT SIGNAL

FIELD OF THE INVENTION

The invention relates to a method of increasing the resolution of a digitised, time-dependent signal, in particular a digital picture signal which consists of a sequence of sampling values in which at each sampling value an associated mean value with higher resolution is formed from this sampling value and at least one subsequent and/or preceding sampling value and the sampling value are replaced by the assoicated mean value. The invention further relates to an arrangement for implementing the method.

DESCRIPTION OF THE RELATED ART

In German patent application No. P 33 09 080.7 a circuit arrangement was proposed for the conversion of an analog picture signal into an amplitude-discrete output signal in which an analog signal is compared with a number of equally spaced reference values. The resolution of this analog-digital converter is increased by the fact that the reference values on the one hand and the analog signal on the other are displaced with respect to one another between the conversion steps for successive picture points. The amplitude-discrete signals obtained in the respective conversion steps are average and an optical value corresponding to the mean value thus obtained is displayed on a picture-reproduction arrangement.

The arrangement proposed in German patent application No. P 33 09 080.7 has the disadvantage that sharp edges or fine structures in the picture, i.e. strong spatial variations of contrast, become obliterated. This obliteration of the contours is due to the fact that the modification frequency of the picture signal with respect to space and time is restricted by the taking of the mean.

In such circuit arrangement for the conversion of analog signals into amplitude-discrete signals, by far the most significant circuit complexity occurs in the analog-digital converter, which converts the analog signal into an amplitude-discrete (digital) signal of high resolution. With increasing requirements with regard to the resoution of the digital signal the circuit complexity is increasing dramatically. The approach is being taken therefore of keeping the resolution of the analog-digital converter as small as possible and of increasing the resolution in an arrangement connected after the analog-digital converter. The information about the actual value of the analog signal which is lost in the case of conversion of the analog signal with only coarse resolution is recovered from the taking of a mean of several sampling values of the digital signal. The principle of such a mean-taking is that signal information on components of high signal frequencies is lost in favour of subsequently obtained information on the resolution. If the concerned is digital signal a picture signal, this means obliteration of the fine picture contours of the brightness or colour jumps.

SUMMARY OF THE INVENTION

The aim of the invention is to devise a method of increasing the resolution of a digitised, time-dependent signal and a circuit arrangement for implementing this method to eliminate obliteration of fast signal variations, for example steep signal edges, whereby fast signal variations are thus transmitted unadulterated, in spite of increasing the resolution of the signal, with simultaneous minimization of the circuit complexity.

The invention achieves this aim in that in a method of the type mentioned in the preamble a sampling value is replaced by the associated mean value only if these two values differ from one another by no more than a given value.

The invention is based on the knowledge that a low resolution of the ditital signal manifests itself particularly in low-frequency signal components. This is also true only when the low-frequency signal components are not additionally superimposed by signal components of higher frequency and distinctive amplitude. For example, in a picture signal, particularly a television signal, steps in the brightness or colour of the picture in the case of coarse resolution become visible preferentially in parts of the picture in which brightness or colour vary only slightly spatially. In areas of the picture with marked brightness or colour transitions the visibility of the steps decrease sharply.

Accordingly, the invention method increases the resolution of the digital signal only in time intervals in which the timededependent signal exhibits low-frequency signal components. In this way no signal components of higher frequency are lost as the result of the mean-taking. In time intervals during which, however, substantial variations of the signal occur, the signal is left unchanged. The analog-digital converter supplied a digitised signal the resolution of which is adapted to the requirements for a strongly varying signal. In time intervals in which the signal exhibits only slight variations, the resolution is then purposefully increased by taking the means of the sampling values and by replacing the latter with the mean values.

The method of the invention has the advantage that the resolution of a digitzed, time-dependent signal is increased in the situation where a high resolution is required, but the fast signal changes are left untouched where these form the dominant component in the signal. In fact, a (subsequent) increase in the resolution of the digital signal always means a certain complexity of circuitry, but this lies in the range of processing of the digital signal and can thus be kept small. When appplying the method of the invention, it is possible to use an analog-digital converter of low resolution, i.e. with a resolution which satisfies the minimum requirements of the resolution for further processing of the digital signal. Compared with an analog-digital converter, the resolution of which satisfies the maximum occurring requirements, there is a considerable reduction in the complexity of circuitry for the processing of the analog signal. This means not only a saving of components, but also of the effort spent on alignment.

At this point it should be noted that in European patent application No. 104689 a circuit arrangement has been proposed for the conversion of an analog video signal into a digital video signal in which the high-order positions of the digital video signal are derived from an analog-digital converter and a counter connected behind this. The low-order positions of the digital video signal, which serve to increase the resolution of the signal supplied by the analog-digital converter, are generated in a further analog converter to which, on the one hand, is fed the original analog video signal and, on the other, the output signal of a digital-analog converter which converts back an analog signal from all the positions of the digital video signal. In the case of variations of the original analog video signal, the value of the ditigal video signal is made to follow the original video signal by adjustment of the low-order positions, i.e. by minimizing the difference between the original analog video signal and the back-converted analog video signal and by the up and down counting of the counter and the change thus caused in the high-order positions delivered by the counter. If the variations in the original analog video signal exceed a certain threshold value, the high-order positions delivered by the analog-digital converter are issued directly as a digital video signal and, at the same time, the low-order positions are set to preset values.

In accordance with a further embodiment of the method of the invention the mean value is obtained by low-pass filtering, The low-pass filtering is a particularly simple method both for the processing of analog and digital signals. Low-pass filtering can also be used for processing high repetition rates of the sampling values.

According to another embodiment of the invention, the sampling values are present as signals representing multi-digit binary numbers. In principle, the sampling values may also be coded in other ways known in the art, for example in BCD code. However, coding in the form of binary words supplies particularly simple and easy-to-process signals.

According to another embodiment of the invention, a number of hihg-order positions of the signals representing binary numbers required for a desired minimum of resolution of the digitzed signal is taken from the sampling values, and positions following the high-order positions intended for increasing the resolution are derived from the mean values.

This refinement of the method according to the invention is based on the knowledge that one sampling value and the associated mean value coincide at least in a number of high-order positions of the signals representing binary numbers if these two values are to differ from one another by no more than a preset amount. It is unimportant whether the said number of high-order positions is then derived from the sampling values or the associated mean values. On the other hand, a sampling value is replaced by its associated mean value ony when it deviates from it by a preset amount. Then, the high-order positions can always be derived from the sampling values and the mean values following the high-order positions and from the positions without falsifying the digitised signal. This offers the advantage that the digitized signal always follows rapid signal changes which manifest themselves in changes of the high-order positions and that at the same time its resolution is increased, with additionally reduced design effort for the processing of the sampling values, i.e. the processing of the high-order positions of the signals representing binary numbers.

A circuit arrangement for implementing the invention method is characterized by a lowpass filter to which the sampling values of the digitised signal are fed and which delivers associated mean values formed from successive sampling values, a delay unit to which the sampling values of the digitised signal are fed and in which the values are delayed by a time which corresponds at least roughly to the group delay of the lowpass filter, an arithmetic circuit, to which the mean values are fed from the lowpass filter and the delayed sampling values from the delay unit and which delivers a switching signal dependent on the deviation of the mean values from the associated sampling values, and a switching element which, controlled by the switching signal of the arithmetic circuit, feeds the delayed sampling values from the delay unit to a subsequent circuit arrangement when the mean values from the lowpass filter and the delayed sampling values from the delay unit differ from one another by more than a preset amount, and otherwise feeds the mean values to the subsequent circuit arrangement.

The circuit arrangement described is constructed fully as an integrated circuit and therefore requires no adjustment. It can be integrated in very compact form on a semiconductor wafer. The circuit comlexity caused by this is small. In particular, lowpass filter and delay unit are used both to identify a deviation between the sampling values and the associated mean values and for the preparation of increased-resolution signals.

In a further development of the invention the lowpass filter is controlled by the switching signal in such a way that the sampling values replace the corresponding positions of the mean values. By means of such a control it is possible, for example, when large variations occur between the sampling values and the associated mean values to adjust the latter to the sampling values. This is particularly advantageous when in addition to low-frequency components the digitised signal exhibits only isolated, steep signal edges. In such a case the resolution of the signal is to be increased immediately before and after the edge. To avoid obliteration of the signal edge, the mean values appertaining to the sampling values immediately before and after the edge must not deviate substantially from the sampling values.

Another circuit arrangement for implementing the invention method is characterised by a lowpass filter to which the sampling vlaues of the digitised signal are fed and which delivers associated mean values formed from successive sampling values, and a delay unit to which the sampling values of the digitised signal are fed and in which they are delayed by a time which corresponds at least roughly to the group delay of the lowpass filter whereby the high-order positions of the signals representing binary numbers and increased in resolution, which are required for the desired minimum resolution of the digitised signal, are taken from the corresponding high-order positions of the sampling values delivered by the delay unit, and the positions following these high-order positions are taken from the mean values supplied by the lowpass filter.

Such a circuit arrangement is used to implement the further development of the invention method, in which the high-order positions of the signals representing binary numbers are taken from the sampling values and the positions following the high-order positions are taken from the mean values. Because the origin or derivation of the individual positions of the signals representing binary numbers is fixed, there is no need for a switching element between the sampling values and the mean values. This reduces the complexity of circuitry.

In a further development of the invention the above-mentioned circuit arrangement has a comparator circuit to which the delayed sampling values from the delay unit and the mean values from the lowpass filter are fed, and which delivers a comparison signal which controls the lowpass filter in such a way that the mean values coincide with the associated sampling values in the high-order positions of the binary numbers required for the minimum resolution. Such a comparator circuit represents a special simplifed development of the above-mentioned arithmetic circuit in which, instead of a determination of two values supplied, a check is merely made of their coincidence in a given number of high-order positions. Such a comparator circuit can be constructed by a very simple gate arrangement.

In a further development of the cirucit arrangements as claimed in the invention, the lowpass filter contains a delay arrangement with an input to which the sampling values are fed and an output which delivers sampling values delayed by a mean-taking period, a subtractor to the positive input of which are fed the sampling values and to the negative input the sampling values delayed by a mean-taking period, and which forms difference values from the values fed to it, together with an accumulator in which the difference values are summed up.

This development of the lowpass filter is based on the knowledge that it is not necessary for the purpose of forming a mean value (corresponding to a time-dependent signal freed of high-frequency components) from successive sampling values to sum up all these to form each mean value. On the contrary, the mean values appertaining to two successive sampling values differ only in the fact that the first sampling value or values of the sum with respect to time is (are) replaced by one or more sampling values following the values summated so far. Accordingly, a mean value can be obtained directly from the mean value preceding it by adding to the preceding mean value the difference of two sampling values delayed by a mean-taking period.

A lowpass filter on these lines is very simple to construct because it makes do with a subtractor and an accumulator instead of the large number of complex adder circuits which are otherwise required.

In a further development of the invention, the delay unit is formed from part of the delay arrangement. Further simplification of the circuitry can be achieved by such dual utilisation of assemblies.

In a further development of the circuit arrangement of the invention, the accumulator, which is formed in a manner known in the art from a storage arrangement with feedback via an adder, has a second switching element which is inserted in the feed from the adder to the storage arrangement and through which the sum signal delivered by the adder or the sampling values delayed by the delay unit are fed to the storage arrangement depending on the deviation of the sampling values from the associated mean values. With this second switching element the lowpass filter can be simply controlled in such a way that particularly in the case of rapid signal changes, especially steep signal edges, a rapid approximation of the mean values delivered by the lowpass filter to the sampling values is obtained.

In a further development of the invention, only the number of high-order positions of the sum signal issued by the adder which is equal to the number of the positions of the sampling values delayed by the delay unit is fed to the second switching element, and the subsequent positions of the sum signal are passed directly to the storage arrangement. Thus the second switching element feeds either the delayed sampling values or the high-order positions of the sum signal to the storage arrangement in such a way that these values or positions appear as high-order positions of the values stored in the storage arrangement. In this way the sampling values with the greatest possible influence on the contents of the storage arrangement and therefore on the signals issued by the lowpass filter are fed to the storage arrangement and at the same time the complexity of circuitry for the switching element is reduced.

In another further development of the invention, the signals summated in the accumulator are issued by the latter by means of a divider as mean values from the low-pass filter. In this divider the sum signal stored in the storage arrangement is divided by the number of the summated sampling values for the purpose of forming the mean value.

In another embodiment of the invention, the signals summated in the accumulator which only have a number of high-order positions equal to the number of positions of the sampling values, augmented by a number of additional positions so as to increase the resolution, are delivered as mean values from the lowpass filter. In the case of signals representing binary numbers, for example, this corresponds to a division by the power of 2 which is allocated to the position of the summated signals which appears as the last position of the mean values. In this way, division is accomplished without additional circuit elements.

In another development of the invention the signals delivered by the accumulator are delivered via a further lowpass element as mean values of the lowpass filter. The further lowpass element contain, preferably, a further adder to which the signals fed to its first input are also fed to its second input delayed by a further delay period and from the output of which the output signal of the further lowpass element is taken. The further lowpass element is used to equalise the signal transit times of the lowpass fitler, on the one hand, and the delay unit, on the other.

The invention will be explained in greater detail below with the aid of the embodiments illustrated in the drawings which show:

DESCRIPTION OF THE DRAWINGS

FIG. 1—a block circuit diagram for a circuit arrangement according to the invention, FIG. 2a—a somewhat more detailed block circuit diagram of a further circuit arrangement according to the invention, FIG. 2b—a modification of part of the circuit arrangement shown in FIG. 2a, FIG. 2c—a modification of another part of the circuit arrangement shown in FIG. 2a.

DETAILED DESCRIPTION OF THE INVENTION

Figure 1:
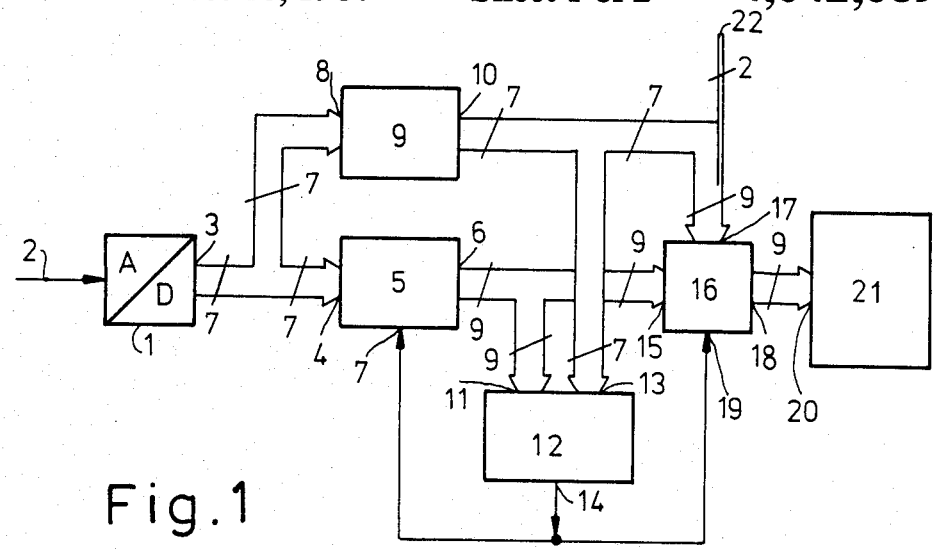

In the circuit arrangement illustrated in FIG. 1, an analog, time-dependent signal is fed to an analog-digital converter 1 at an analog input 2. In a manner known in the art the analog signal is sampled in the analog-digital converter at a sequence of times the repetition frequency of which, for example, is determined by a clock signal which is fed to the analog-digital converter via a clock pulse line not illustrated in FIG. 1. At the output 3 of the analog-digital converter 1 there then appears a digitised, time-dependent signal which consists of a sequence of sampling values. The sampling values are present in the form of multi-position signals representing binary numbers and are passed on via multiple lines in which a conductor is provided for each position. In the present example the binary number delivered by the analog-digital converter has seven positions, output 3 therefore has seven connections for seven conductors.

The signals (sampling values) issued from the output 3 of the analog-digital converter may also be coded in another form, for example in BCD-code, etc. The circuit arrangement is then to be modified accordingly.

From the output 3 of the analog-digital converter the sampling values are fed, on the one hand, to an input 4 of a lowpass filter 5 and, on the other hand, to an input 8 of a delay unit 9. The lowpass filter 5 is designed, for example, in a known manner as a digital filter. An improved embodiment is illustrated in FIG. 2. The delay unit 9 is in the form, for example, of a clocked shift register.

In the lowpass filter 5 mean values are formed from successive sampling vlues fed from output 3 of the analog-digital converter and are delivered at output 6 of the lowpass filter 5. By formation of the mean values, the resolution of the signal at output 6 has been increased to nine positions-by two positions compared with the sampling values. Accordingly, the output 6 of the lowpass filter 5 has nine connections.

Via a ninefold line the mean values from output 6 of lowpass filter 5 are fed, on the one hand, to a first input 11 of an arithmetic circuit 12 and, on the other hand, to a first input 15 of a switching element 16. Accordingly, from the output 10 of the delay unit 9 the sampling values delayed by the delay time of delay unit 9 but otherwise unchanged are fed via a sevenfold line to a second input 13 of the arithmetic circuit 12, on the one hand, and to a second input 17 of the switching element 16, on the other. The delay time of the delay unit 9 corrresponds to the group delay of the lowpass filter 5 so that the delayed sampling values and the associated mean values are present simultaneously at the inputs 15, 17 of switching element 16. In the arithmetic unit 12 the deviation between the sampling values from output 10 of the delay unit 9 and the mean values of output 6 of the lowpass filter 5 is determined. If this deviation exceeds a certain amount which, for example, is permanently set within the arithmetic circuit 12 or is also variable, the arithmetic circuit 12 issued at output 14 a switching signal which is fed both to a switching signal input 7 of the lowpass filter 5 and to a switching input 10 of the switching element 16.

The switching element 16 also has an output 18 which, when the switching signal occurs at the switching input 19, is connected to the second input 17 and otherwise to the first input 15. The output 18 of the switching element 16 is connected by way of a ninefold line to an input 20 of a subsequent circuit arrangement 21. Thus, when a switching singal is present, the sampling values are fed to the subsequent circuit arrangement 21 and otherwise the mean values. At the subsequent ciruit it is possible to use any arrangement for passing-on, processing, conversion, representation etc. of the digitised time-dependent signal.

To the second input 17 of switching element 16, which in the present embodiment has nine connections, the sampling values are fed on a sevenfold line in such a way that the positions of the sampling values are allocated to the seven high-order positions at the input 18 of the switching element 16. To fill the remaining two positions, filling signals are fed to the second input 17 of the switching element 16 by way of a twofold line 22. By means of these filling signals the two least significant positions of the second input 17 of switching element 16 and therefore, with appropriate connection, the least significant positions of output 18 can be given arbitrarily selectable values. For example, these values may be set to zero or fixed by a random number generator. It is also possible to derive these values from the least significant positions of the mean values delivered by the lowpass filter 5.

The switching signal fed to the switching signal input 7 also controls the lowpass filter in such a way that the sampling values replace the corresponding digits of the mean values when the mean values and the delayed sampling values from the delay unit differ from one another by more than a presettable amount. The lowpass filter is thereby bypassed, as it were, in the high-order positions of the mean values representing binary numbers. This shortens the transient time of the lowpass filter 5 particularly after the occurrence of rapid signal jumps.

Figure 2B:
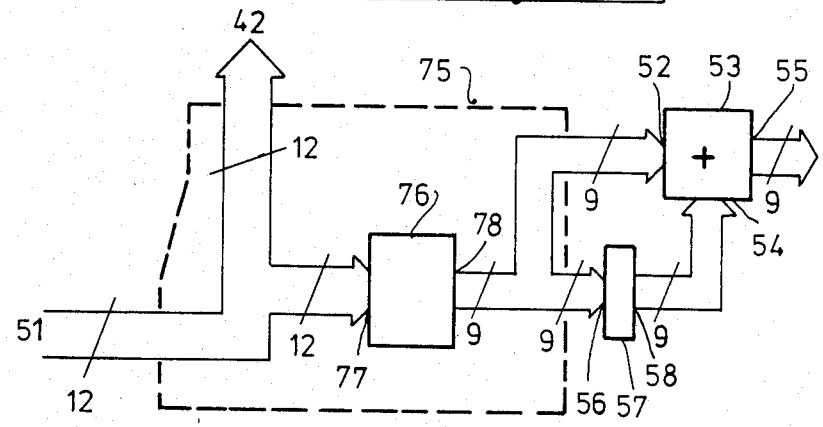
Figure 2C:
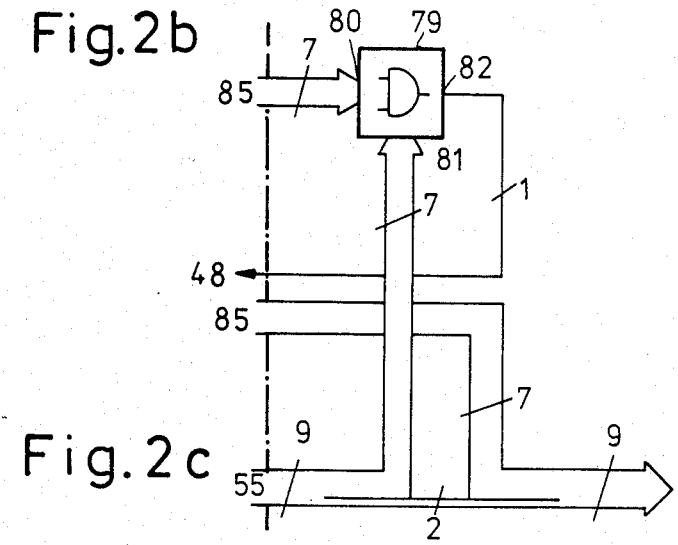
Figure 2A:
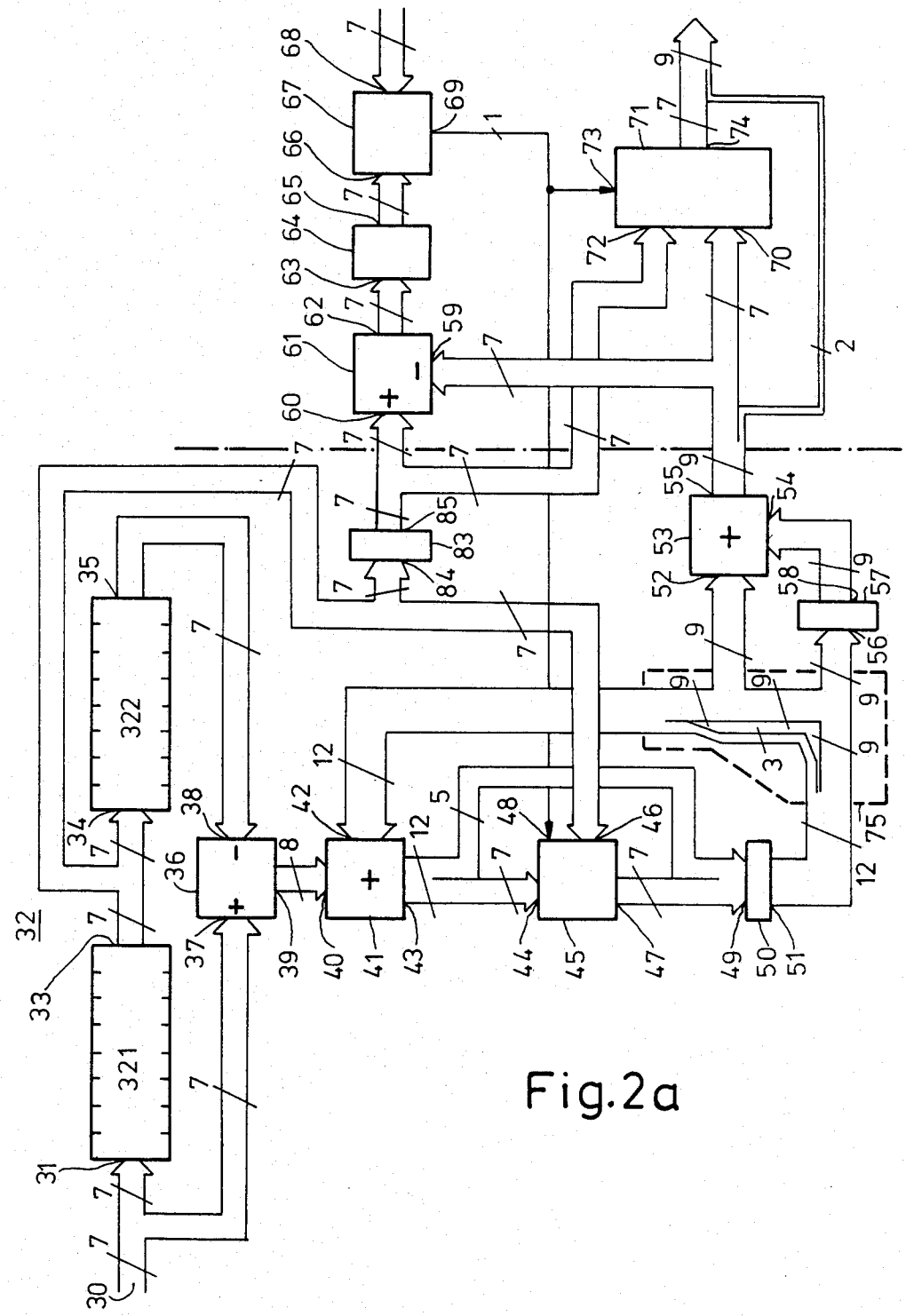

FIG. 2a shows a somewhat more detailed block circuit diagram of a further embodiment of the invention. The digitized, time-dependent signal is fed via a line 30 with, for example, seven conductors for sampling values, which are transmitted in the form of signals representing seven-digit binary numbers, to an input 31 of a first part 321 of a delay arrangement 32. The first part 321 of the delay arrangement 32 consists of eight delay stages in each of which the sampling values are delayed by a time interval which is equal to the time interval of the sequence of every two sampling values. The first part 321 of the delay arrangement 32 consists, for example, of an eight-stage shift register for seven parallel bits, which are operated with the same clock pulse which is also fed to the analog-digital converter. At output 33 of the first part 321 of the delay arrangement 32, therefore, the sampling values appear with a delay of eight sampling clock pulse intervals.

From the output 33 of the first part 321 of the delay arrangement 32 the sampling values are fed via a sevenfold line to an input 34 of a second part 322 of the delay arrangement 32 and are delayed in this second part 322 once again by eight sampling clock pulse intervals. At the output 35 of the second part 322 of the delay arrangement 32, therefore, the sampling values appear, delayed by sixteen sampling clock pulse intervals with respect to the signals on line 30.

The undelayed sampling values of line 30 are fed to a positive input 37 of a subtracter 36, and the delayed sampling values from output 35 of the second part 322 of delay arrangement 32 are fed to a negative input 38 of the subtracter 36. The subtracter 36 supplies at its output 39 the difference of the sampling values fed to its inputs 37, 38 and passes it via an eightfold line to a first input 40 of an adder 41.

The adder 41, together with a storage arrangement 50, forms an accumulator. In addition, the signals which are delivered at the output 43 of the adder 41 are fed to an input 49 of the storage arrangement 50 and are stored in the latter. The stored signals appear at an output 51 of the storage arrangement 50 and are fed from there to a second input 42 of the adder 41. The adder 41 forms the sum of the signals at its inputs 40, 42 and delivers these at its output 43.

The delay arrangement 32, the subtracter and the accumulator, embracing mainly adder 41 and storage arrangement 50, form a very simple lowpass filter for the formation of a mean value from sixteen successive sampling values. The mean-taking period, by which the sampling values are delayed in the delay arrangement 32, amounts therefore in this arrangement to fifteen sampling clock intervals. The group delay of the lowpass filter is equal to half of the mean-taking period and amounts therefore to seven and a half sampling clock intervals. The sampling values summed in the accumulator are divided by the number 16 to form the mean value. Since, because of the structure of the signals, represents binary numbers, a separate divider is not required, thus a further simplification is achieved.

This accumulator, which is known in the art, is extended in the embodiment illustrated in FIG. 2a by a second switching element 45 which is inserted in the line between the output 43 of the adder 41 and the input 49 of the storage arrangement 50. The second switching element 45 has a first input 44 to which are fed the seven high-order positions from the in-all twelve-position output 43 of the adder 41. From an output 47 of the second switching element 45 a seven-conductor line leads to the terminals of the input 49 of storage arrangement 50 which are allocated to the seven higher-order positions of storage arrangement 50. The connection terminals of output 43 of ader 41, which correspond to the next five positions, are connected directly to the corresponding connection terminals of the input 49 of the storage arrangement.

The second switching element 45 also has a second input 46 to which the sampling values delayed by eight sampling clock intervals are fed from the output 33 of the first part 321 of the delay arrangement 32. The second switching element 43 is also fed by way of a switching input 48 a switching signal by means of which, depending on the deviation of the sampling values from the associated mean values, the second switching element 45 can be switched in such a way that either the appropriate high-order positions of the summed signal delivered at its output 43 by the adder 41 or the sampling values delayed by eight sampling clock intervals are fed to the terminals of the input 49 of storage arrangement 50, which appertain to the high-order positions. In the first case the loop formed by the adder 41 and the storage arrangement 50 operates as an accumulator, and in the second case the storage contents of the storage arrangement 50 are adjusted by the externally supplied sampling values or adapted to rapid variations in the time-dependent signal.

This has the result that even after rapid, isolated signal jumps the storage content of the storage arrangement 50 is immediately adjusted to the value of the time-dependent signal; whereas, without switching, the storage content is gradually adjusted to the value of the time-dependent signal only with the continuous taking of means. The second switching element 45 switches only the high-order positions in the number of the positions of the sampling values. There are no positions in the sampling values opposite the positions in the summed signal which follow, which means that these following positions are fed immediately to the storage arrangement 50.

From the signal representing twelve-position binary numbers at output 51 of storage arrangement 50, the nine high-order positions are fed, on the one hand, to a first input 52 of a further adder 53 and, on the other, to an input 56 of a further delay arrangement 57. The signal from input 56 which is delayed in the further delay arrangement 57 by a sampling clock interval is delivered at an output 58 and fed via a ninefold line to a second input 54 of the further adder 53. The sum of the signals at its inputs 52, 54 issues by the further adder 53 at an output 55. The further adder 53 and the further delay arrangement 57 together form a further lowpass filter. The group delay of this further lowpass filter 53, 57 between the output 51 of storage arrangement 50 and the output 55 of the further adder 53 amounts to half a sampling clock interval. With the delay due to storage arrangement 50 by a complete sampling clock interval and the group delay of delay arrangement 32 and subtracter 36, a delay of nine sampling clock intervals with respect to line 30 at the output 55 is provided.

From the signals at the output 55 of the further adder 53 which represent nine-position binary numbers the seven high-order positions are fed to a negative input 59 and the sampling values delayed by nine sampling clock intervals according to the group delay of the lowpass filter 32, 36, 41, 45, 50, 53, 57 are fed to a positive input 60 of a second subtracter 61. The delayed sampling values are taken for this purpose from output 85 of a third delay arrangement 83, the input 84 of which is connected to the output 33 of the first part 321 of delay arrangement 32. In a modification of this arrangement a tap with seven conductors is led out from the second part 322 of delay arrangement 32 after the first delay stage behind input 34 and is connected to input 60 of the subtracter 61. The third delay arrangement 83 is then redundant.

The difference in the signals fed to inputs 59, 60, which appears at the output 62 of the subtracter 61, is fed to an input 63 of an amount-forming stage 64 which at its output 65 delivers the amount of the signal fed to its input 63.

From the output 65 of the amount-forming stage 64, the signal representing the amount of the difference between the delayed sampling values and the mean values issued from the output 55 of the further adder 53 passes to a first input 66 of a comparator stage 67 to which an ajustable threshold value is fed at a second input 68. The comparator stage 67 compares the signals fed to its inputs and, at an output 69, delivers a switching signal when the signal fed to the first input 66 exceeds the adjustable threshold value. The seven high-order positions of the signals from output 55 of the further adder 53 are passed on to a first input 70 of a switching element 71 and the delayed sampling values from the output 85 of the third delay arrangement 83 are fed to a second input 72 of switching element 71. In addition, the switching signal from output 69 of comparator stage 67 is fed to switching element 71 by way of a switching input 73.

When the value of the signal at the first input 66 of the comparator stage 67 exceeds the threshold value fed to the second input 68 and thus a switching signal occurs at output 69, the switching element 71 is switched by the latter in such a way that the signals at its second input 72 are fed to its output 74. If no switching signal occurs, the first input 70 is connected to the output 74. Moreover, when a switching signal appears at the output 69 of the comparator stge 67, the second switching element is switched in such a way that its second input 46 is connected to its output 47; while in the other case, the first input 44 is connected to the output 46.

In the example described, the same switching signal for output 69 of the comparator stage 67 is fed to the switching inputs 48 and 73. Also, however, two different switching signals may be generated in comparator stage 67 in such a way that, for example, a different threshold value is taken as the basis for the switching of the second switching element 65 from that for the switching of switching element 71.

The two positions following the seven high-order positions of the signal delivered by the output 55 of the further adder 53 are led past switching element 71 and united with the seven positions delivered by switching element 70 at its output 74 to form a nine-position output signal in such a way that the high-order positions of the signal from output 74 and the positions led past switching element 71 form the positions following these high-order positions.

FIG. 2b shows a modification of the decoupling 75, outlined by the dashed line in FIG. 2a, of the signals corresponding to the mean values, from the accumulator 41, 50, which in FIG. 2a represents a division by the number 16 and which in FIG. 2b is designed with a separate divider 76 for division by any number. The sum signal from the output 51 of storage arrangement 50 is fed to an input 77 of the divider 76, the divided value is taken from an output 78 of the divider 76 and is fed in the manner already described to the inputs 52 or 56 of the further adder 53 or the further delay arrangement 57 respectively.

FIG. 2c shows a simplification of the part of the circuit arrangement shown to the right of the dot-dash line in FIG. 2a. In the case where the high-order positions of the signals representing binary numbers are taken from the sampling values and the positions following the high-order positions are taken from the mean values without switching of the high-order positions of the signal fed to a subsequent circuit arrangement taking place between the sampling values and the mean values, there is no need to provide a switching element for this purpose. The positions of the delayed sampling values from output 85 of the third delay arrangement 83 are combined as high-order positions with the last two positions of the mean values from the output 55 of further adder 53 as the positions following the high-order positions to form a nine-position output signal.

The modification of the circuit as shown in FIG. 2c contains an additional comparator circuit 79 to which by way of a first input 80 the delayed sampling values are fed from the output 85 of the third delay arrangement 83 and to which at a second input 81 are fed the seven high-order positions of the mean values delivered from output 55 of further adder 53. If the signals at the inputs 80, 81 of the comparator circuit 79 do not agree, the circuit delivers at an output 82 a comparison signal which is fed to the switching input 48 of the second switching element 45 and by means of which the signal from output 86 of the third delay arrangement 83 is switched to the high-order positions of storage arrangement 50.

What is claimed is:

1. Method of increasing the resolution of a digitized time-dependant video signal, the video signal including a sequence of sampling values, the method comprising the steps of:
    obtaining a sampling value;
    forming by low-pass filtering an associated mean value with higher resolution from the sampling value and at least one adjacent sampling value; and
    replacing the sampling value by the associated mean value only when the sampling value and the associated mean value differ by no more than a predetermined amount.

2. Method according to claim 1, wherein the obtaining step comprises:
    securing the sampling value from the sequence of sampling values in the form of multi-position signals, the signals being representative of binary numbers.

3. Method according to claim 2, further comprising:
    taking from the sampling values binary number signals having a number of high-order positions required for a minimum desired resolution of the digitized signal;
    taking from mean values positions following the high-order positions for increasing the resolution.

4. Circuit for increasing the resolution of a digitized time-dependant video signal, the video signal including a sequence of sampling values, the circuit comprising:
    a low-pass filter having inputted thereto the sampling values of the digitized signal, the filter outputting associated mean values formed from successive sampling values;
    a delay unit having inputted thereto the sampling values of the digitized signal, the sampling values being delayed by a time corresponding approximately to the delay of the low-pass filter;
    an arithmetic circuit having inputted thereto the mean values outputted from the low-pass filter and the delayed values from the delay unit, the arithmetic circuit generating a switching signal dependant on the deviation of the mean values from the associated sampling values;
    a switching element, being controlled by the switching signal, and working cooperatively with the delay unit for feeding the delayed sampling values from the delay unit to a subsequent circuit when the mean values from the low-pass filter and the delayed sampling values from the delay unit differ by more than a predetermined amount, the switching element feeding the mean values to the subsequent circuit when the mean values and the delayed sampling values do not differ by more than the predetermined amount.

5. Circuit according the claim 4, wherein the low-pass filter is controlled by the switching signal for replacing the corresponding positions of the mean values with the sampling values.

6. Circuit for increasing the resolution of a digitized time-dependant video signal, the video signal including a sequence of sampling values of binary number signals having a number of high-order positions required for a minimum desired resolution of the digitized signal, the circuit comprising:
    a low-pass filter having inputted thereto the sampling values of the digitized signal, the filter outputting associated mean values formed from successive sampling values;
    a delay unit having inputted thereto the sampling values of the digitized signal, the sampling values being delayed by a time corresponding approximately to the delay of the low-pass filter;
    wherein, for the binary number signals having the high-order positions increased in resolution for obtaining the desired minimim resolution of the digitized signal, the binary number signals are taken from corresponding high-order positions of the sampling values outputted by the delay unit; and wherein the positions following the high-order positions are taken from the mean values outputted by the low-pass filter.

7. Circuit according to claim 6, further comprising;
    a comparator circuit having inputted thereto the delayed sampling values from the delay unit and the mean values from the low-pass filter, the comparator circuit generating a comparison signal for controlling the low-pass filter, thereby effecting the mean values to coincide with the associated sampling values in the high-order positions of the binary numbers required for the minimum resolution.

8. Circuit according to claim 4 or 6, wherein the low-pass filter comprises:
- a delay means having fed thereto the sampling values, the delay means including an output for transmitting sampling values delayed by a mean-taking period;
- a subtractor having fed thereto the sampling values and the delayed by a mean-taking period samplng values for forming difference values therefrom; and
- an accumulator for summing the difference values.

9. Circuit according the claim 8, wherein the delay unit is formed from part of the delay means.

10. Circuit according to claim 8, wherein the accumulator comprises:
- a storage means connected by feedack to an adder; and wherein the circuit further comprising:
- a second switching element interposed between the adder and the storage means for transmitting, depending on the deviation of the sampling values from the associated mean values, either a signal summed by the adder or the sampling values delayed by the delay unit to the storage means.

11. Circuit according to claim 10, wherein the adder supplies only the number of high-order positions of the summed signal equalling to the number of the positions of the sampling values delayed by the delay unit to the second switching element, subsequent positions of the summed signal being fed directly to the storage means.

12. Circuit according to claim 8, further comprising:
- a divider working cooperatively with the accumulator for releasing from the accumulator the signals summed therein as the mean values from the low-pass filter.

13. Circuit according to claim 8, wherein the low-pass filter generates from the signals summed in the accumulator mean values, only with a number of high-order positions equalling to the number of the positions of the sampling values, the high-order positions being augmented by a number of additional positions to increase the resolution.

14. Circuit according the claim 8, further comprising:
- a second low-pass filter for transmitting the signals outputted from the accumulator.

15. Circuit according the claim 14, wherein the second low-pass filter comprises:
- a second adder having first and second inputs for receiving signals transmitted from the accumulator, the signals fed to the second input being delayed by a certain period, the second adder further having an output for transmitting the output signals of the second low-pass filter.

* * * * *